United States Patent
Kaminski

[11] Patent Number: 5,885,408
[45] Date of Patent: Mar. 23, 1999

[54] METHOD AND APPARATUS FOR DELIVERING LABELS AND THE LIKE TO A COMPRESSION MOLDING MACHINE FOR MOLDING PLASTIC CLOSURES

[75] Inventor: Ronald S. Kaminski, Bowling Green, Ohio

[73] Assignee: Owens-Illinois Closure Inc., Toledo, Ohio

[21] Appl. No.: 867,090

[22] Filed: Jun. 2, 1997

[51] Int. Cl.⁶ ........................................................ B65C 9/00
[52] U.S. Cl. .......................... 156/567; 156/245; 156/568; 156/571; 156/DIG. 31; 264/509
[58] Field of Search ..................................... 156/567, 568, 156/571, 572, 570, DIG. 31, DIG. 38, 245; 264/509

[56] References Cited

U.S. PATENT DOCUMENTS

| | | |
|---|---|---|
| 2,811,744 | 11/1957 | Baldanza . |
| 3,122,598 | 2/1964 | Berger . |
| 3,125,801 | 3/1964 | Fields . |
| 3,270,101 | 8/1966 | Jardine et al. . |
| 3,463,845 | 8/1969 | De Pass et al. . |
| 3,999,915 | 12/1976 | Stepenske . |
| 4,025,255 | 5/1977 | Sutch . |
| 4,255,220 | 3/1981 | Kucheck et al. ............ 156/DIG. 38 X |
| 4,269,579 | 5/1981 | Thomas . |
| 4,301,099 | 11/1981 | Broeksema et al. . |
| 4,412,797 | 11/1983 | Murayama . |
| 4,537,739 | 8/1985 | Ruhl . |
| 4,588,465 | 5/1986 | Paciorek . |
| 4,639,341 | 1/1987 | Hanamoto et al. . |
| 4,682,463 | 7/1987 | Foldesi . |
| 4,710,338 | 12/1987 | Bagnall et al. . |
| 4,719,739 | 1/1988 | Foldesi . |
| 4,726,876 | 2/1988 | Tomsovic, Jr. ..................... 156/571 X |
| 4,794,750 | 1/1989 | Schmidt et al. . |
| 4,801,348 | 1/1989 | Takagaki ............................ 156/568 X |
| 4,803,031 | 2/1989 | Ochs et al. . |
| 4,816,110 | 3/1989 | Foldesi et al. . |
| 5,096,652 | 3/1992 | Uchiyama et al. . |
| 5,104,306 | 4/1992 | Gordon et al. ...................... 156/571 X |
| 5,116,452 | 5/1992 | Eder ........................... 156/DIG. 38 X |
| 5,132,071 | 7/1992 | Sorensen . |
| 5,223,315 | 6/1993 | Katsura et al. .............. 156/DIG. 5 X |
| 5,238,640 | 8/1993 | Masui et al. . |
| 5,254,302 | 10/1993 | Yamanaka . |
| 5,344,305 | 9/1994 | McKillip . |
| 5,368,798 | 11/1994 | Mizukoshi et al. . |
| 5,401,457 | 3/1995 | Valyi . |
| 5,431,274 | 7/1995 | Schaupp ...................... 156/DIG. 31 X |

*Primary Examiner*—James Engel

[57] ABSTRACT

A method and apparatus for delivering labels and the like to a compression molding machine for molding plastic closures wherein the labels or disks are delivered successively from a source to the cavities. The method and apparatus comprises an indexing turret supporting a plurality of stacks of labels, a pick and place turret for removing a label from a stack, and a label inserter turret which tracks a portion of the path of the cavities of the compression molding machine and delivers the labels successively into the cavities.

11 Claims, 12 Drawing Sheets

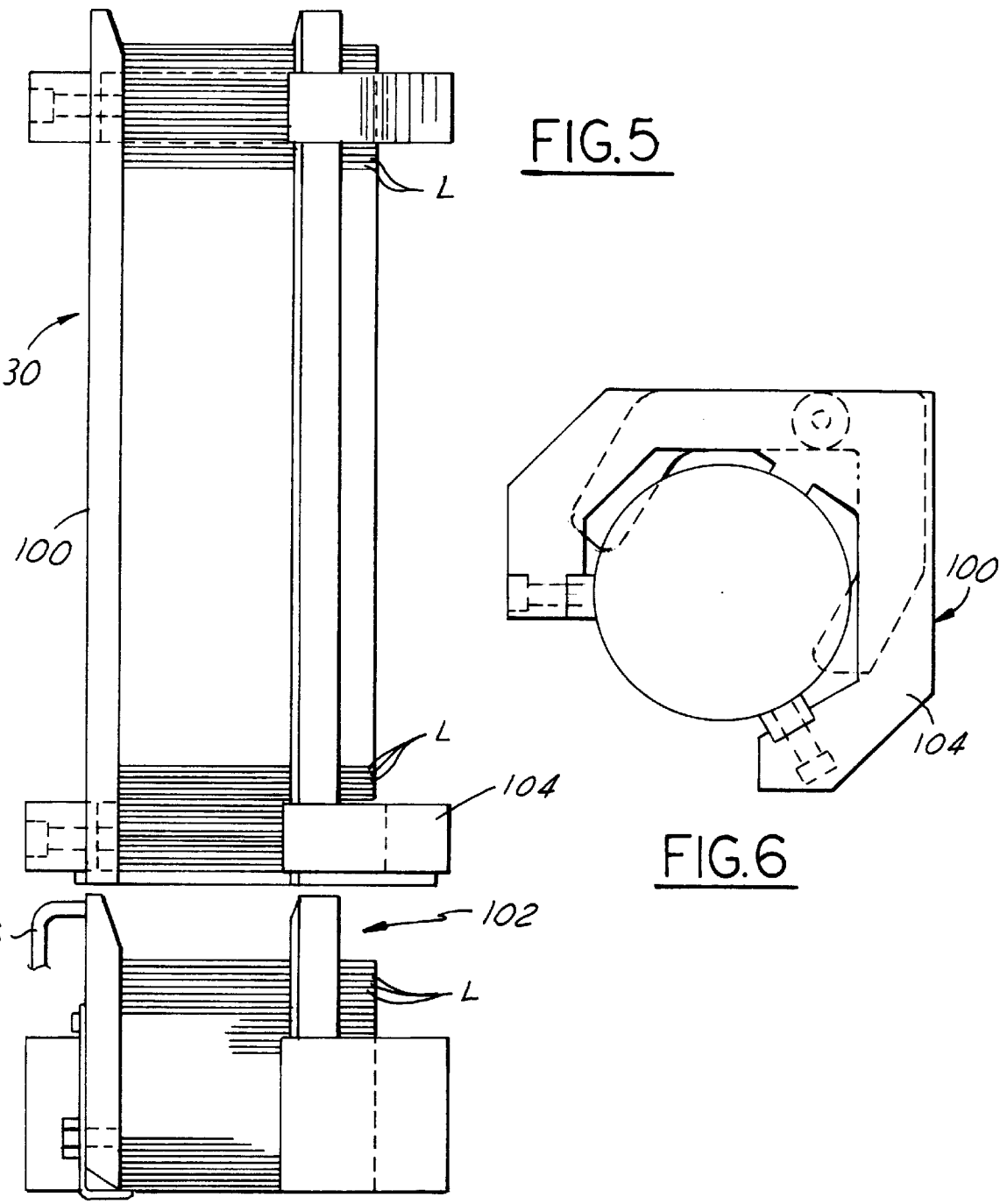

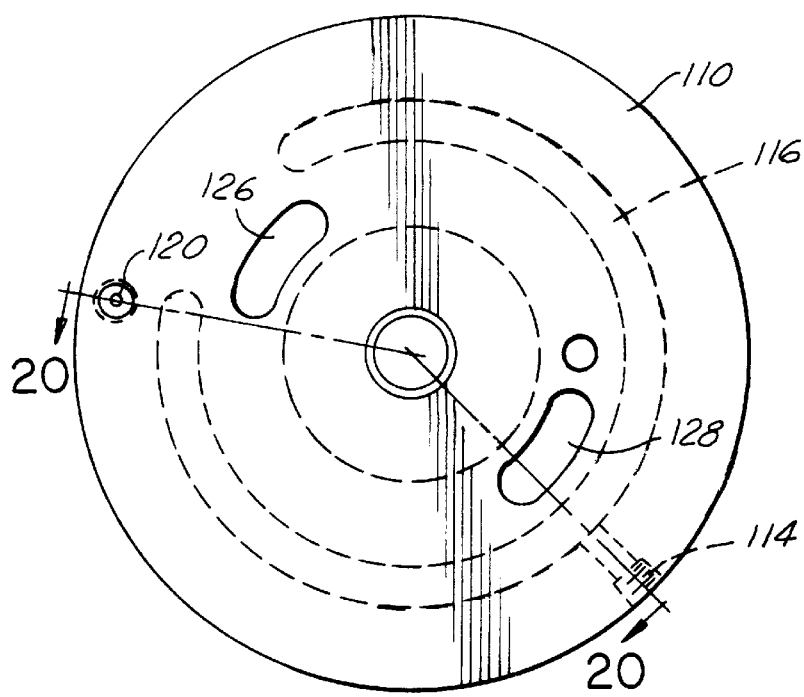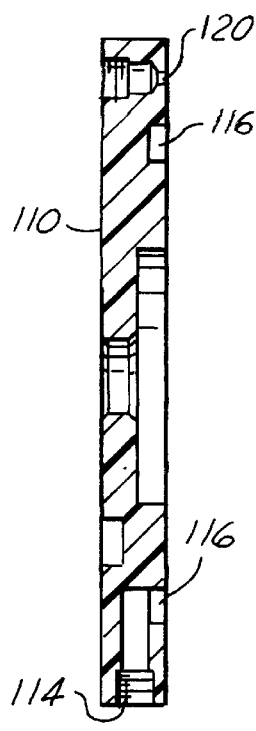
FIG.19    FIG.20
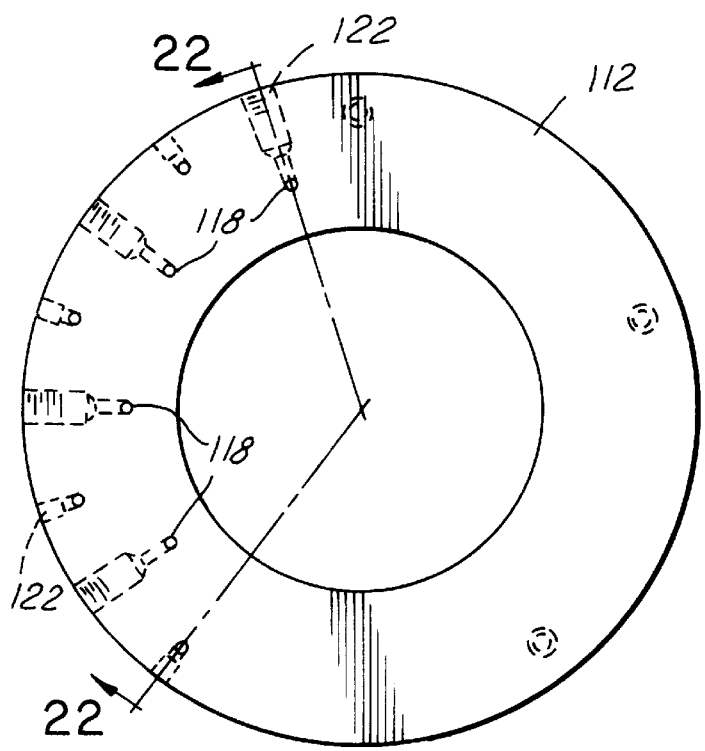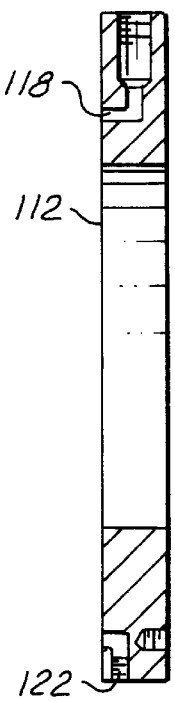
FIG.21    FIG.22

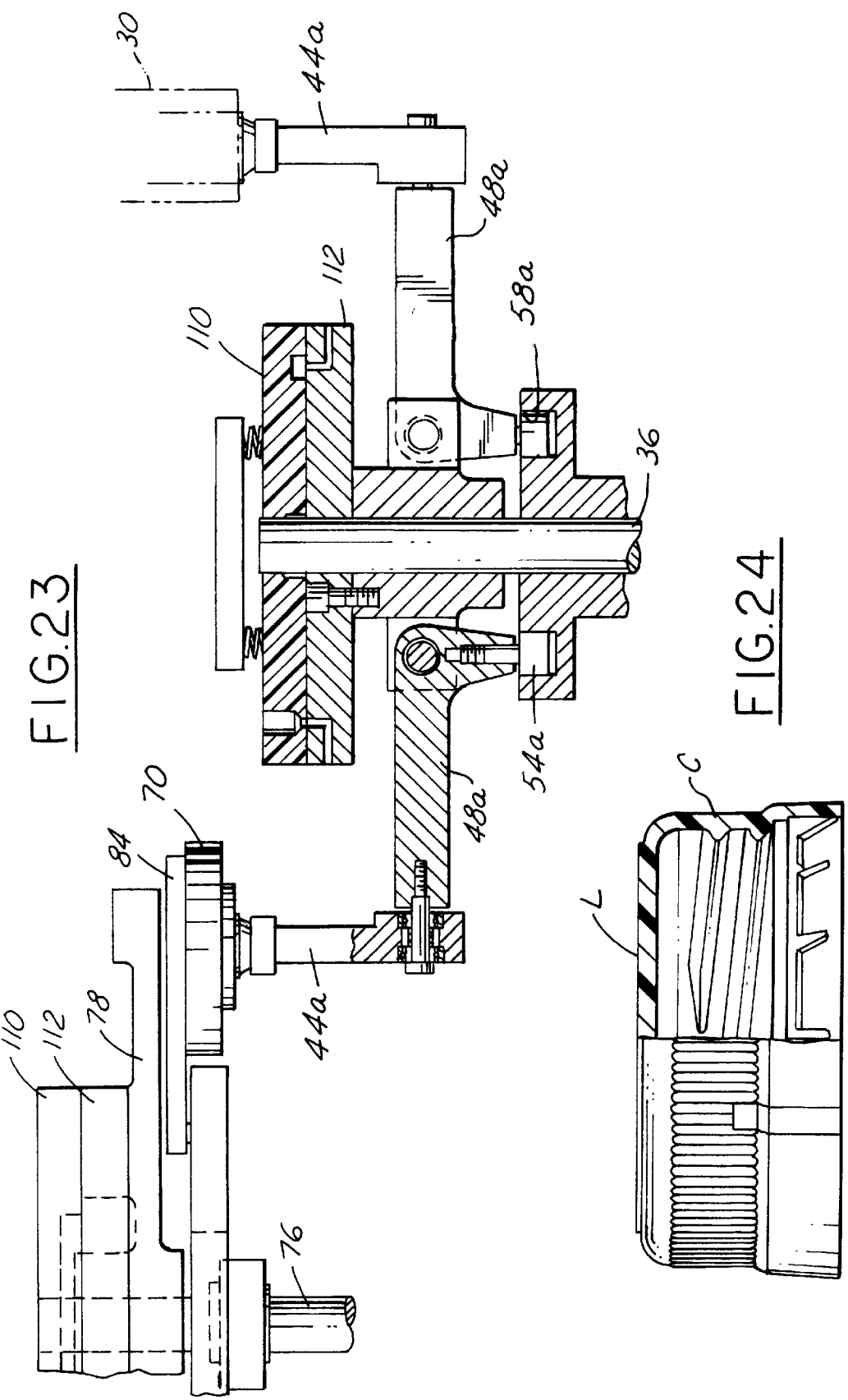

METHOD AND APPARATUS FOR DELIVERING LABELS AND THE LIKE TO A COMPRESSION MOLDING MACHINE FOR MOLDING PLASTIC CLOSURES

This invention relates to compression molding plastic closures and particularly to compression molding plastic closures with labels or disks embedded therein.

BACKGROUND AND SUMMARY OF THE INVENTION

In the compression molding of plastic closures, a charge of molten plastic is delivered to the tooling of the machine and the charge is molded to the final shape by the tooling. In such a machine, a turret supports a plurality of tooling sets, each including a cavity and a core in a rotary turret. It has been heretofore proposed to decorate the base wall of the closure on the interior or the exterior thereof.

Among the objectives of the present invention are to provide a plastic closure with a label or disk embedded in the closure, and a method and apparatus wherein the label or disk is delivered successively to the cavities of the compression molding machine.

In accordance with the invention, the labels or disks are delivered successively from a source to the cavities. The method and apparatus preferably comprises an indexing turret supporting a plurality of stacks of labels, a pick and place turret for removing a label from a stack, and a label inserter turret which tracks a portion of the path of the cavities of the compression molding machine and delivers the labels successively into the cavities.

DESCRIPTION OF THE DRAWINGS

FIG. 5 is an elevational view of a label supply.

FIG. 6 is a top plan view on the label supply shown in FIG. 5.

FIG. 18A is a sectional view taken along the line 18A—18A in FIG. 9.

FIG. 19 is a plan view of a portion of the apparatus shown in FIG. 18.

FIG. 20 is a sectional view taken along the line 20—20 in FIG. 19.

FIG. 21 is a plan view of another portion of the apparatus shown in FIG. 18.

FIG. 22 is a sectional view taken along the line 22—22 in FIG. 21.

FIG. 23 is a part sectional elevational view of a modified form of label pick up and delivery system.

FIG. 24 is a part sectional elevational view of a closure made in accordance with the invention.

DESCRIPTION OF THE PREFERRED EMBODIMENTS

Figure 1:
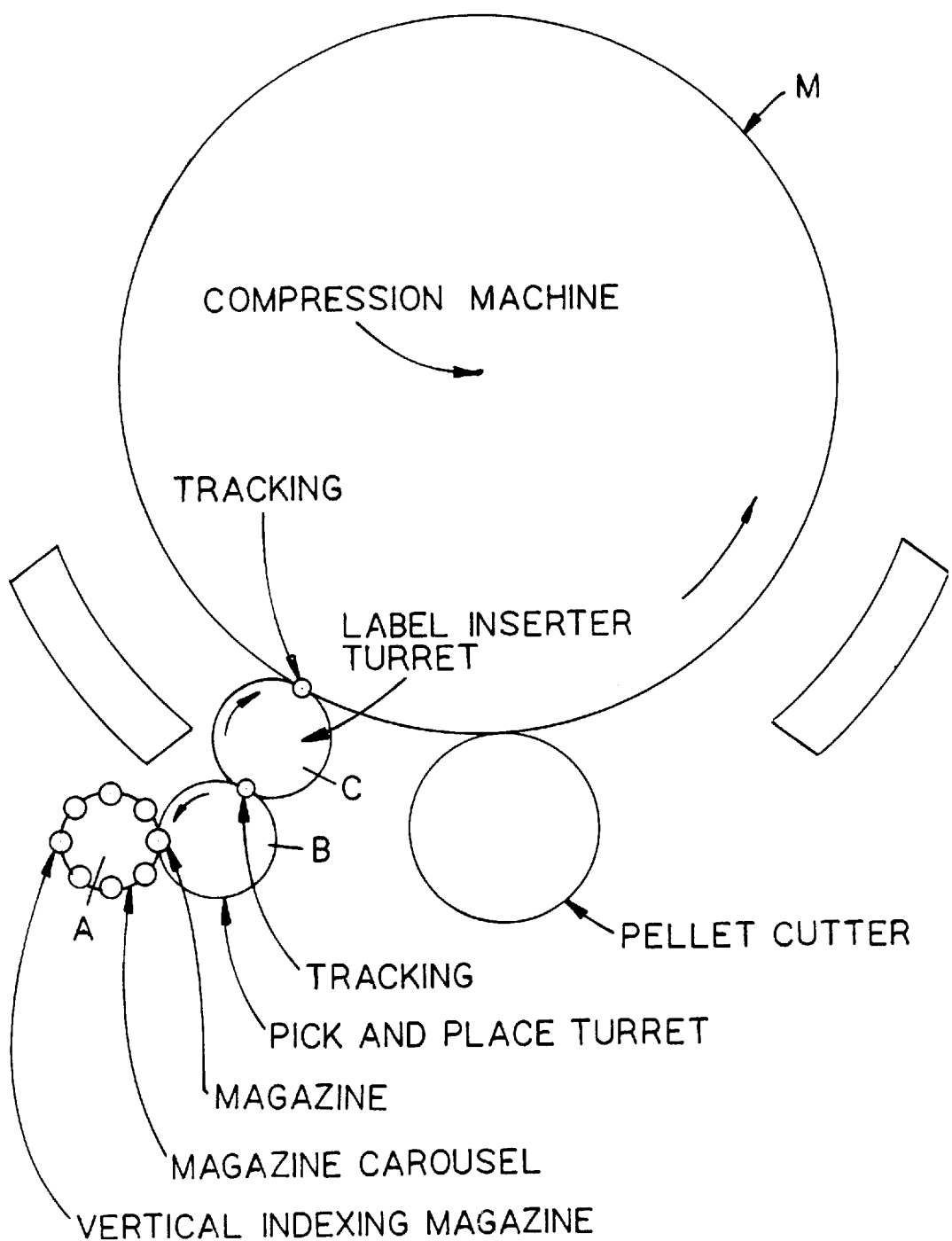
FIG. 1 is a schematic plan view of the system embodying the invention.

Referring to FIG. 1, which is a schematic view of the method and apparatus for compression molding plastic closures with labels or disks embedded therein, the apparatus comprises an intermittently driven turret A which includes a plurality of label magazines for delivering labels or disks to a rotatable pick and place turret B. As used herein, a label shall mean a flexible label or a rigid disk. Turret B picks a label from the magazine and delivers it to a rotatable inserter label turret C. Turret C receives a label from the turret B and delivers the label to a cavity of the compression molding machine M which thereupon receives a molten charge of plastic and the charge is compression molded to form a closure having an embedded label therein. During the delivery of the label, the path of the label tracks the movement of the cavity in order to insure the proper delivery of the label to the cavity.

Figure 2:
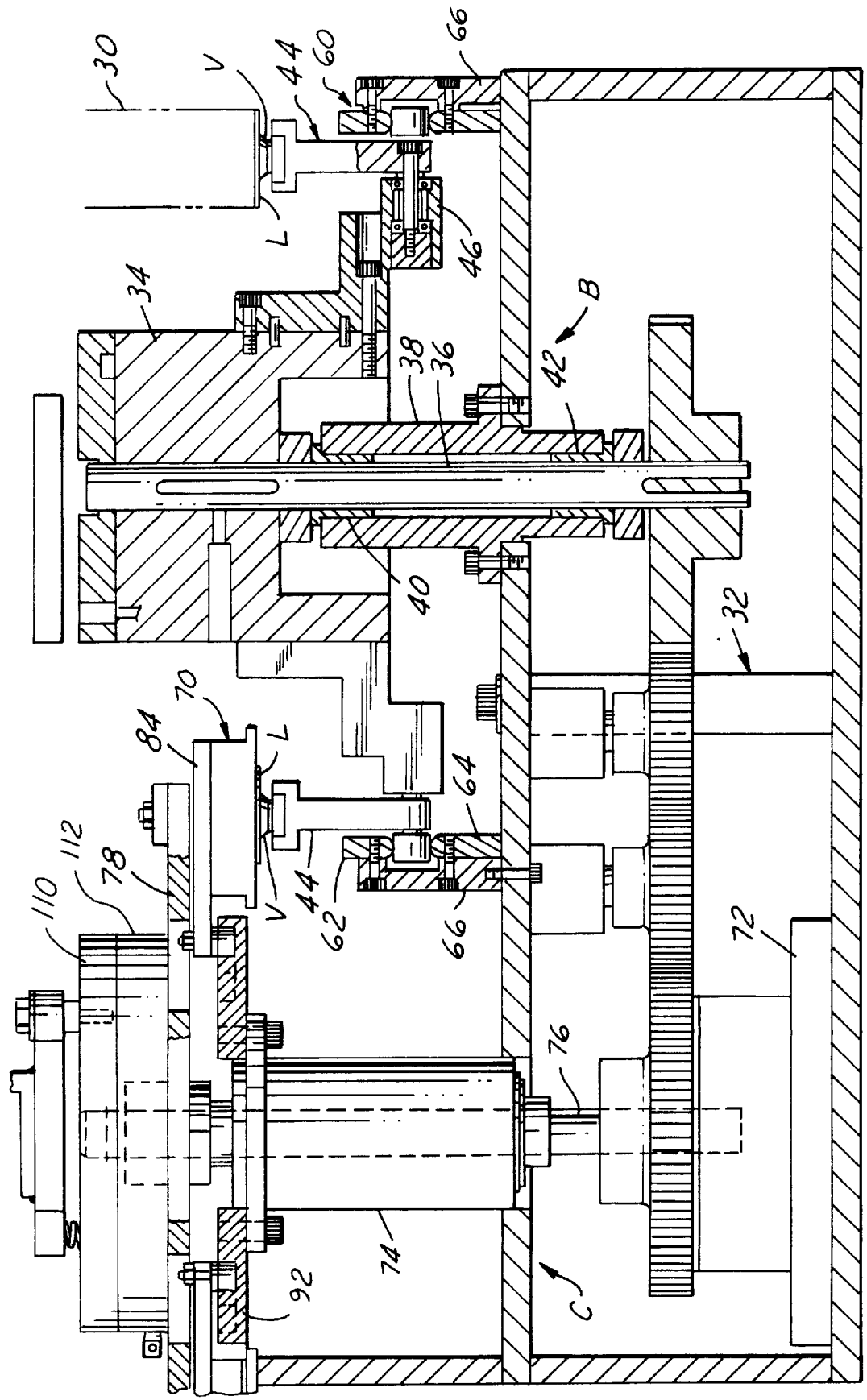
FIG. 2 is a part sectional elevational view of a portion of the system.
Figure 3:
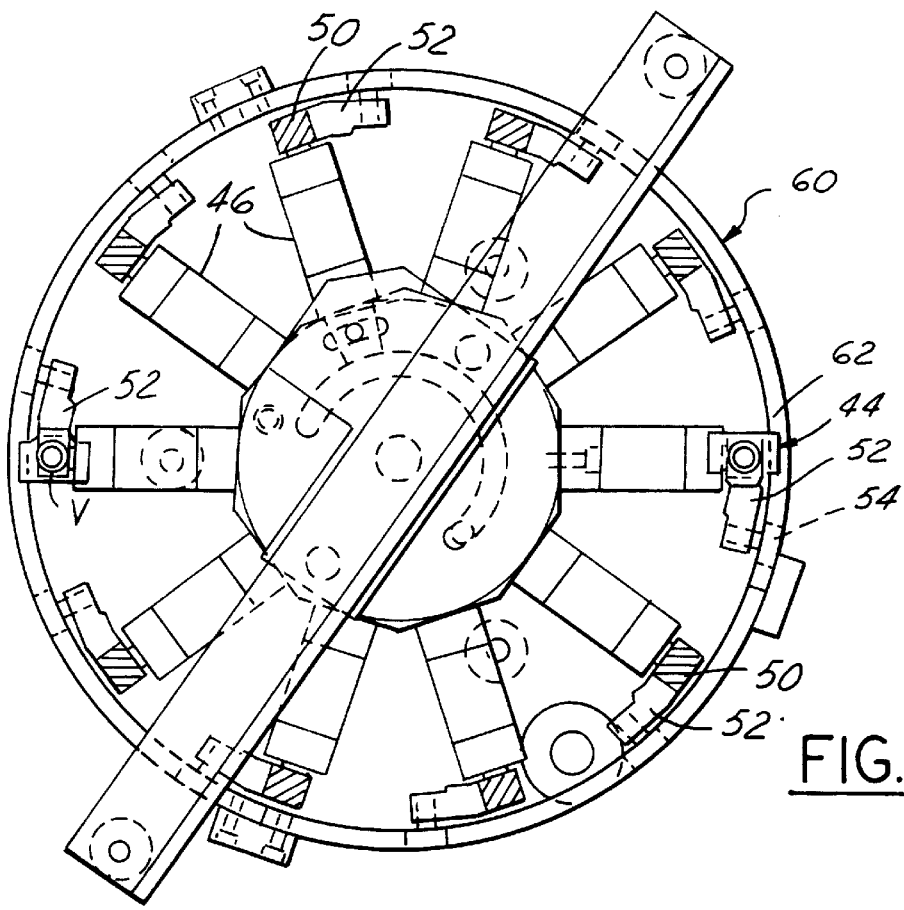
FIG. 3 is a part sectional plan view of a portion of the system.

Referring to FIG. 2, the apparatus of turret B is shown for removing a label L from a magazine 30 and delivering it to the turret C. Turret B comprises a base 32 and a rotatable turret 34 including a vertical shaft 36 rotatably mounted on a column 38 by spaced bearings 40, 42. A plurality of vacuum cup and crank arm assemblies 44 are provided on turret 34 for oscillating movement about radial axes (FIG. 3) by horizontal radial bearings 46.

Figure 14:
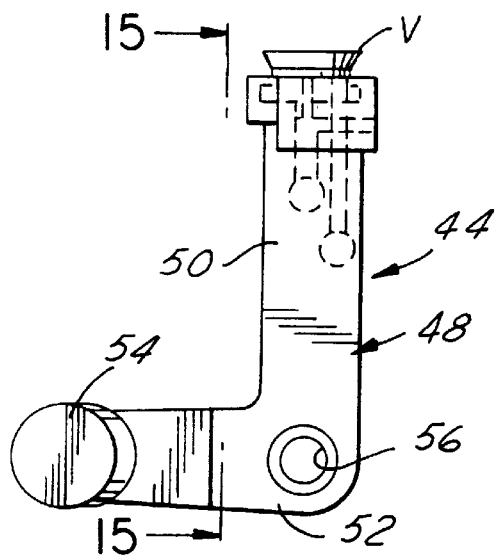
FIG. 14 is an elevational view of the vacuum cup crank and cam follower used in the portion of the system shown in FIGS. 2 and 3.
Figure 15:
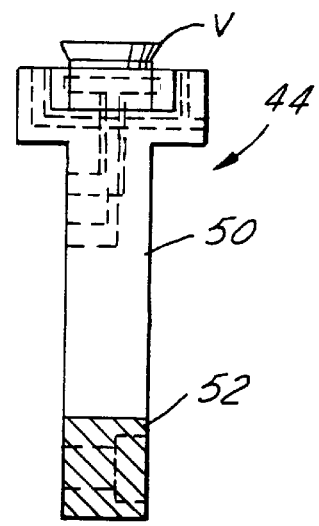
FIG. 15 is a sectional view taken along the line 15—15 in FIG. 14.
Figure 16:
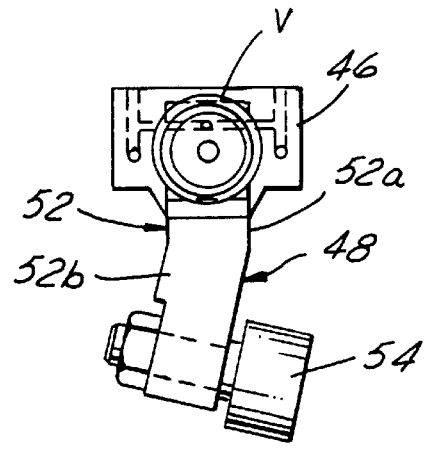
FIG. 16 is a top plan view of the vacuum cup crank and cam follower shown in FIG. 14.
Figure 17:
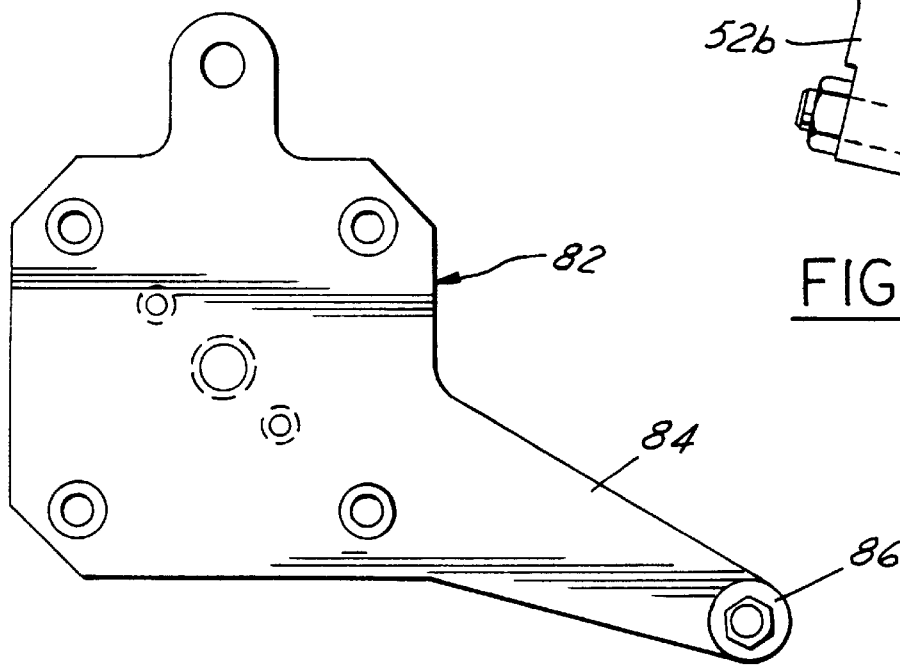
FIG. 17 is a plan view of a crank cam follower used in a portion of the system shown in FIGS. 2, 7 and 8.

Referring to FIGS. 14–16, each vacuum cup and crank arm assembly 44 comprises a crank 48 that has a first generally vertical crank arm 50 and a second generally horizontal crank arm 52 at 90° (FIG. 14) and an angle (FIG. 16). The horizontal crank arm 52 has a first portion 52a adjacent to arm 50 and a second portion 52b at an obtuse angle to first portion 52a. A vacuum cup V is provided on the end of first crank arm 50 and a cam follower 54 is provided on the end of second portion 52a of crank arm 52. A pivot shaft opening 56 is provided at the juncture of crank arm 50 and crank arm 52.

Referring to FIGS. 2–4 and 11, the cam followers 54 of the several crank arm assemblies 44 ride in a slot track 58 of a cylindrical slot cam 60 which comprises an upper portion 62 and a lower portion 64 supported by circumferentially spaced brackets 66 on base 32.

As the turret B is rotated in a counterclockwise direction as viewed on FIG. 1, each vacuum cup V and crank assembly 44 is moved past the magazine 30. As each assembly approaches a label, it is tilted as shown diagrammatically in FIG. 4. An approaching vacuum cup V is tilted upwardly and forwardly into engagement with the lowermost label in magazine 30 and then lowered and tilted rearwardly, thereby picking off the label. The assembly 44 is then brought to a position where the crank arm 50 is vertical and adjacent the turret C to deliver the label L to one of a plurality of vacuum head assemblies 70 circumferentially spaced on label placement turret C (FIG. 2).

Figure 8:
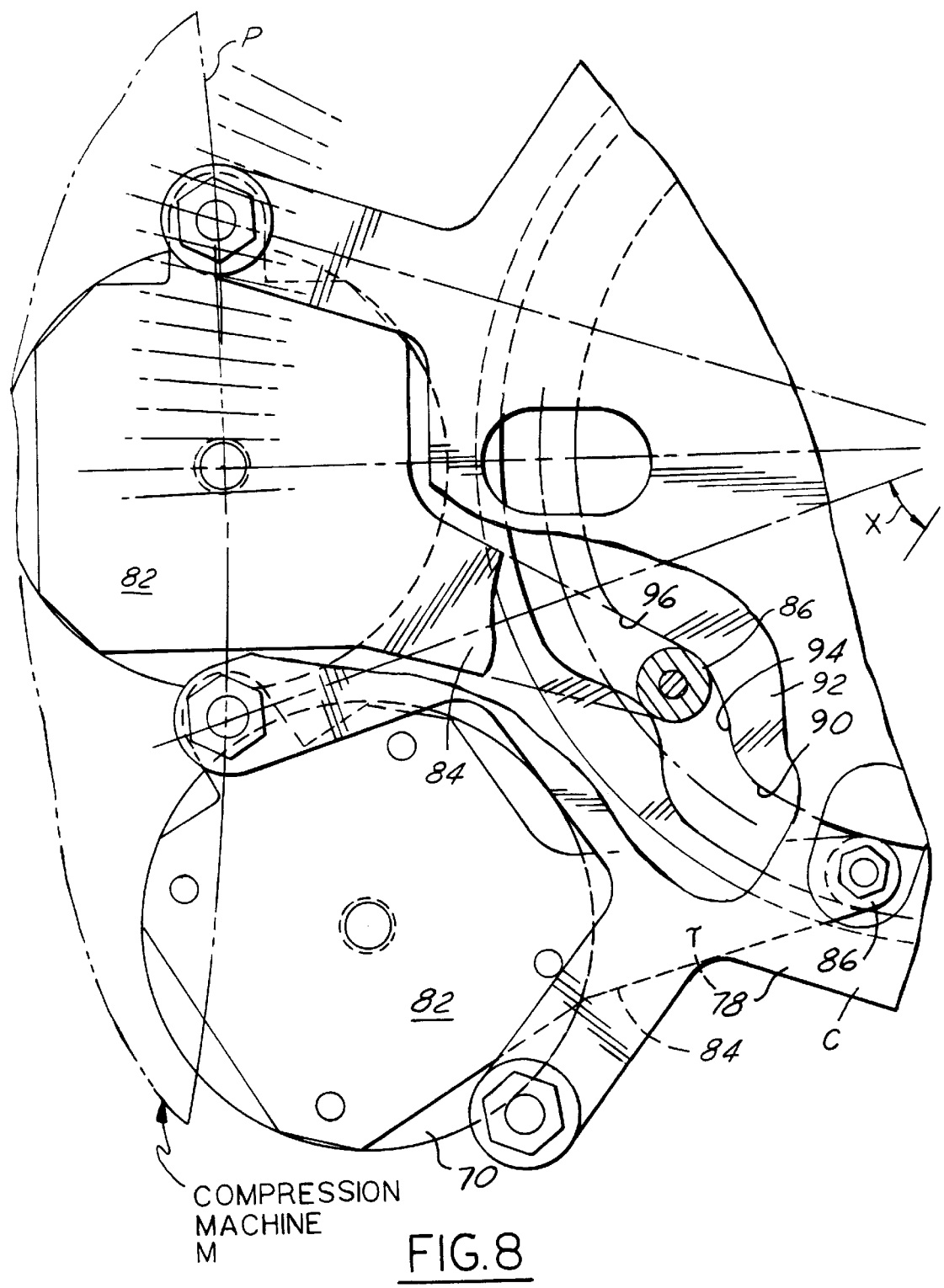
FIG. 8 is a partly diagrammatic part sectional fragmentary enlarged view of a portion of the system shown in FIG. 7.
Figure 9:
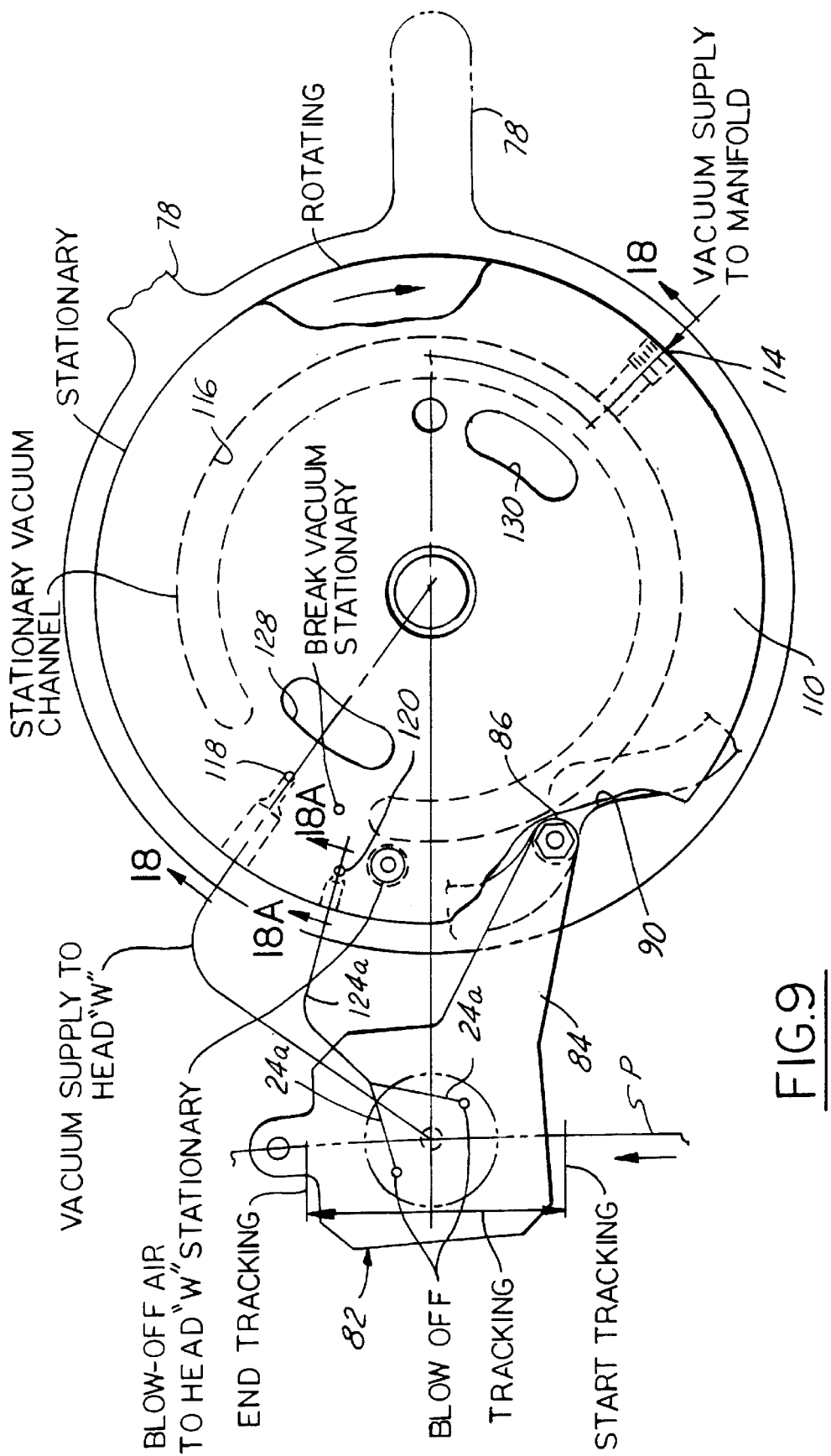
FIG. 9 is a diagram of the vacuum and blow off air system used in a portion of the system shown in FIGS. 2, 7 and 8.
Figure 10:
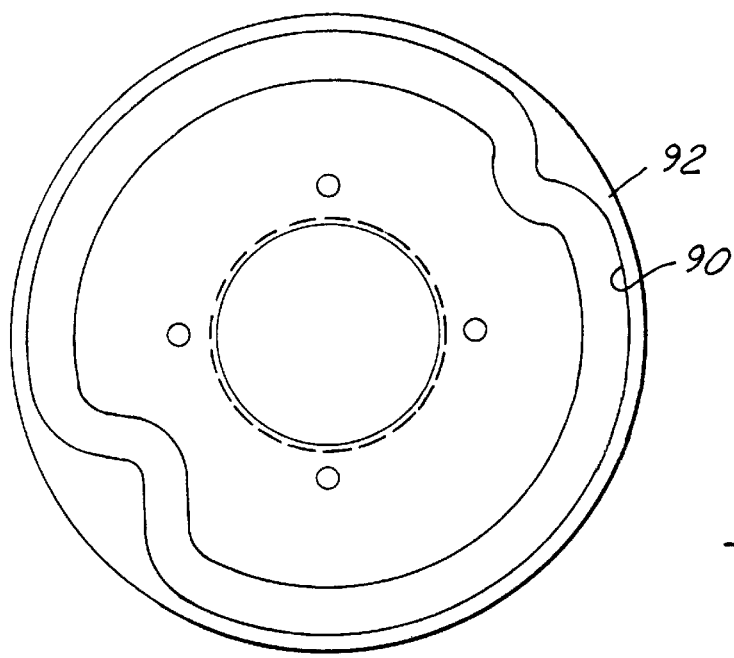
FIG. 10 is a plan view of a cam used in the portion of the system shown in FIGS. 2, 7 and 8.
Figure 11:
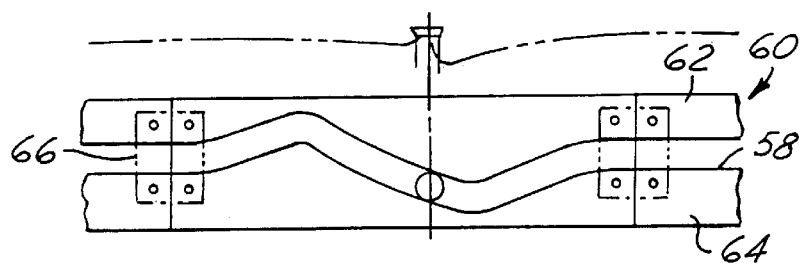
FIG. 11 is a fragmentary elevation view of a cam used on a portion of the system in FIGS. 2 and 3.
Figure 12:
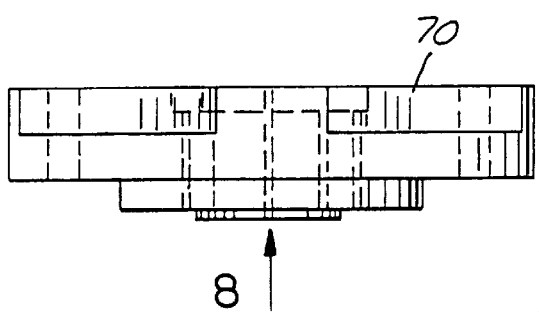
FIG. 12 is an elevational view of a portion of the system shown in FIGS. 2, 7 and 8.
Figure 13:
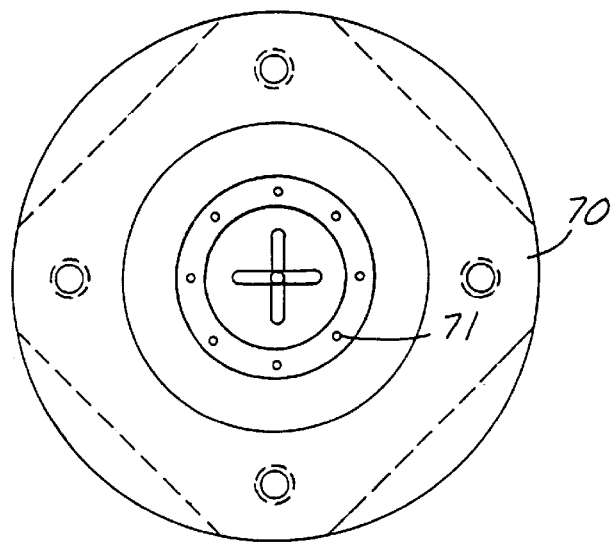
FIG. 13 is a bottom plan view of a portion of the system shown in FIGS. 2, 7 and 8.

Referring to FIGS. 2, 7, 8, 17 and 18, turret C includes a base 72 having a hollow column 74 thereon in which a vertical shaft 76 on a turret 78 is rotatably mounted by spaced roller bearings 80. Each vacuum head assembly 70 comprises a crank 82 having a crank arm 84 with a cam follower 86 thereon. Each vacuum head assembly 70 and crank 82 is rotatably mounted on turret 78 by a vertical roller bearing 88 and held in place by a nut and bolt. The several cam followers 86 ride a cam track 90 of a cam 92 (FIGS. 2, 8–10 and 18). The cam track 90 has a configuration such that, at the positions for receiving a label from turret B and delivering a label to a cavity of the compression molding machine M, each vacuum assembly 70 moves along the arc of travel of the crank arm assemblies 40 of turret B and the travel of cavities of the compression molding machine M (FIGS. 1, 8 and 9). Referring to FIGS. 8 and 9, at each of these two positions, the cam track 90 has a radially inwardly extending portion 94 and radially outwardly extending portion 96 that causes crank 82 to oscillate such that the vacuum head assembly 70 and associated head W follows a path P that has its center at an angle X (FIG. 8) to the normal path.

Figure 18:
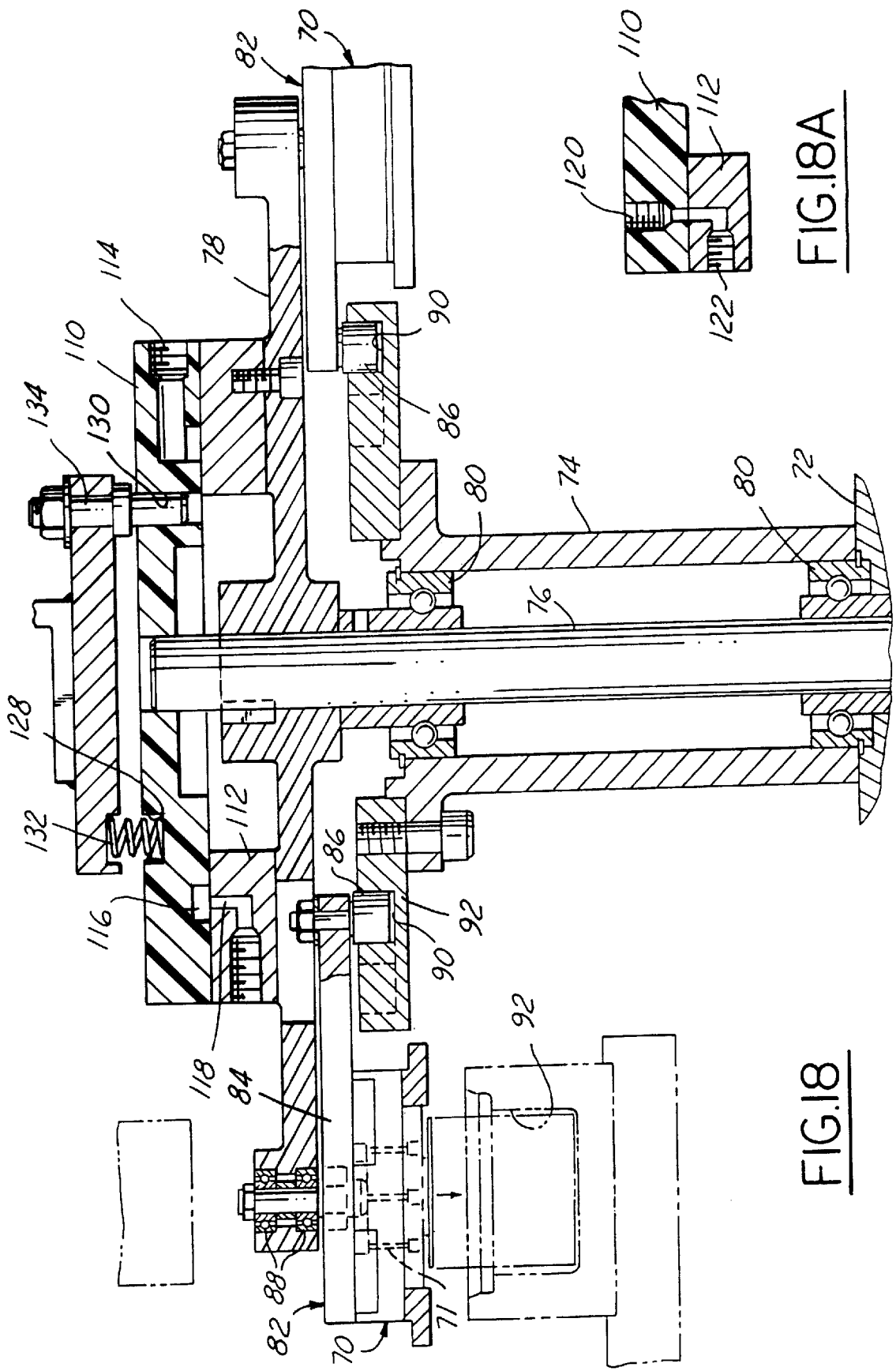
FIG. 18 is a part sectional elevational view of a label delivery system taken along the line 18—18 in FIG. 9.

Referring to FIGS. 9 and 18, 22 a stationary manifold 110 is yieldingly urged downwardly on a distributor manifold 112 fixed on the turret 78. Vacuum is supplied to the manifold 110 through a lateral opening 114 and flows to an arcuate passage 116 in manifold 110. Circumferentially spaced axial openings 118 are provided in the distributor manifold 112 such that they communicate with passage 116 as the turret 78 rotates. The stationary manifold 110 also includes an axial inlet 120 for blow off air which supplies air to a plurality of radial air outlets 122 in distributor manifold 112 and connected by hoses 124a, 24a to each head assembly 70. Manifold 110 includes arcuate slots 128, 130 on the top surface into which springs 132 and a timing pin 134 extend, respectively.

Referring to FIGS. 5 and 6, each label magazine 30 includes an upper supply section 100 providing a larger supply of labels L and a lower section 102. In production, the label supply is in both sections 100 and 102 combined. When the "Low label" sensors 5 in section 102 signals the level of labels is low, the carousel indexes a loaded section 100 directly over section 102. A gate 104 on the bottom of section 100 opens releasing labels into section 102. As the labels are used up in 100 and labels in 102 reach the low level, the carousel index repeats. The operator reloads the 100 section(s) with fresh labels as needed.

In operation, pick-and-place turret B and label insertion turret C are rotated in synchronization with mold turret M by the gears illustrated in FIG. 2. As each crank arm assembly 44 in turn approaches magazine 30 on turret A, vacuum is applied to the vacuum cup V of that crank arm assembly, through manifold plates 110, 112 in FIG. 23, vacuum lines (not shown) and the internal crank arm passages shown in phantom in FIGS. 14–16. The crank arm is pivoted (FIG. 4) so that the vacuum cup approaches the bottom label of the magazine in an upward angular motion. When the cup contacts the lowermost label in the magazine, the vacuum applied to the cup effectively grabs the label. The cup is then moved away from the magazine 30 in a downward angular direction (FIG. 4) to remove the label from the magazine. As each crank arm assembly 44 approaches tangency with label insertion turret C, the same crank arm assembly motion takes place to present the label to the underside of a vacuum head assembly 70 on turret C. At this point, vacuum is removed from the cup V of that crank arm assembly by operation of manifold plates 110, 112 in FIG. 23, so that the label L can be transferred.

As each vacuum head assembly 70 on turret C is rotated in turn toward tangency with turret B, the crank 82 on which that vacuum head assembly is mounted cooperates with track 90 on cam 92 to move the vacuum head assembly at constant orientation over a small arc of rotation so that a label L can be transferred from turret B. Vacuum is applied to the vacuum head assembly by manifold plates 110, 112 and lines 124a (FIGS. 7 and 9) so that the vacuum head assembly picks up the label from the underlying crank arm assembly 44. Turret C then rotates the vacuum head assembly 70 and label carried thereby toward mold turret M. As the vacuum head assembly approaches tangency with turret M, crank 82 again cooperates with cam track 90 to move the vacuum head assembly at constant orientation to turret M over a small arc. Vacuum is released from the vacuum head assembly, and the label drops into the underlying compression mold cavity on turret M.

Figure 4:
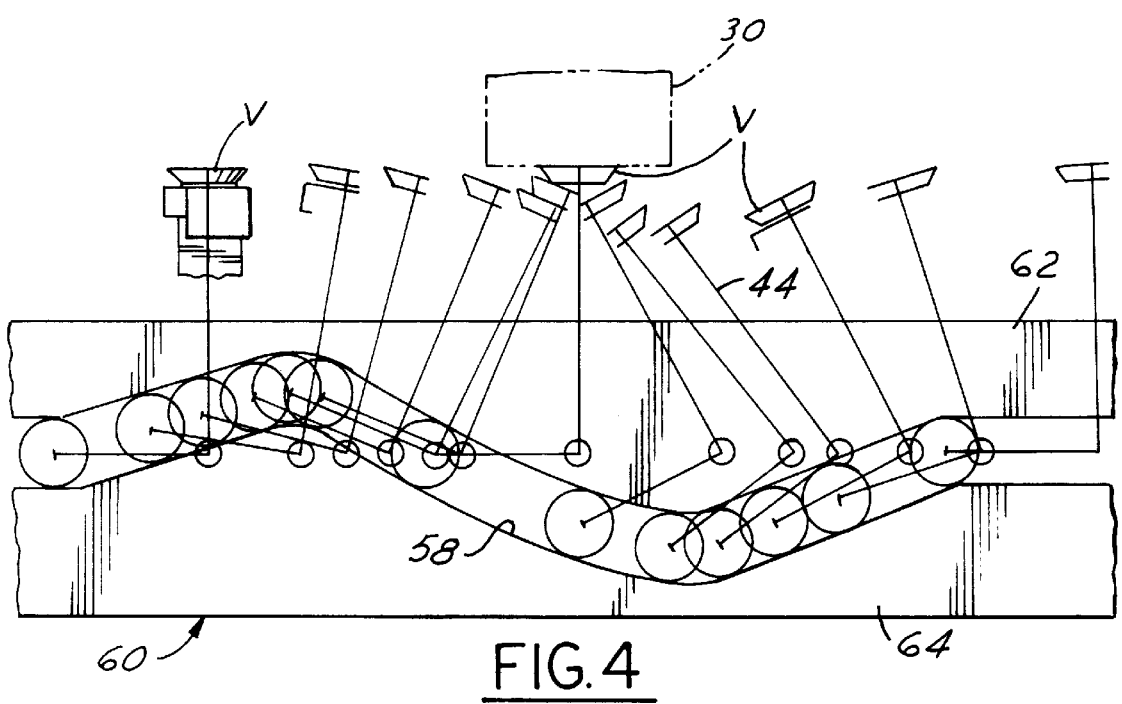
FIG. 4 is a schematic diagram of the movement of the vacuum cups on the label pick off shown in FIGS. 2 and 3.
Figure 7:
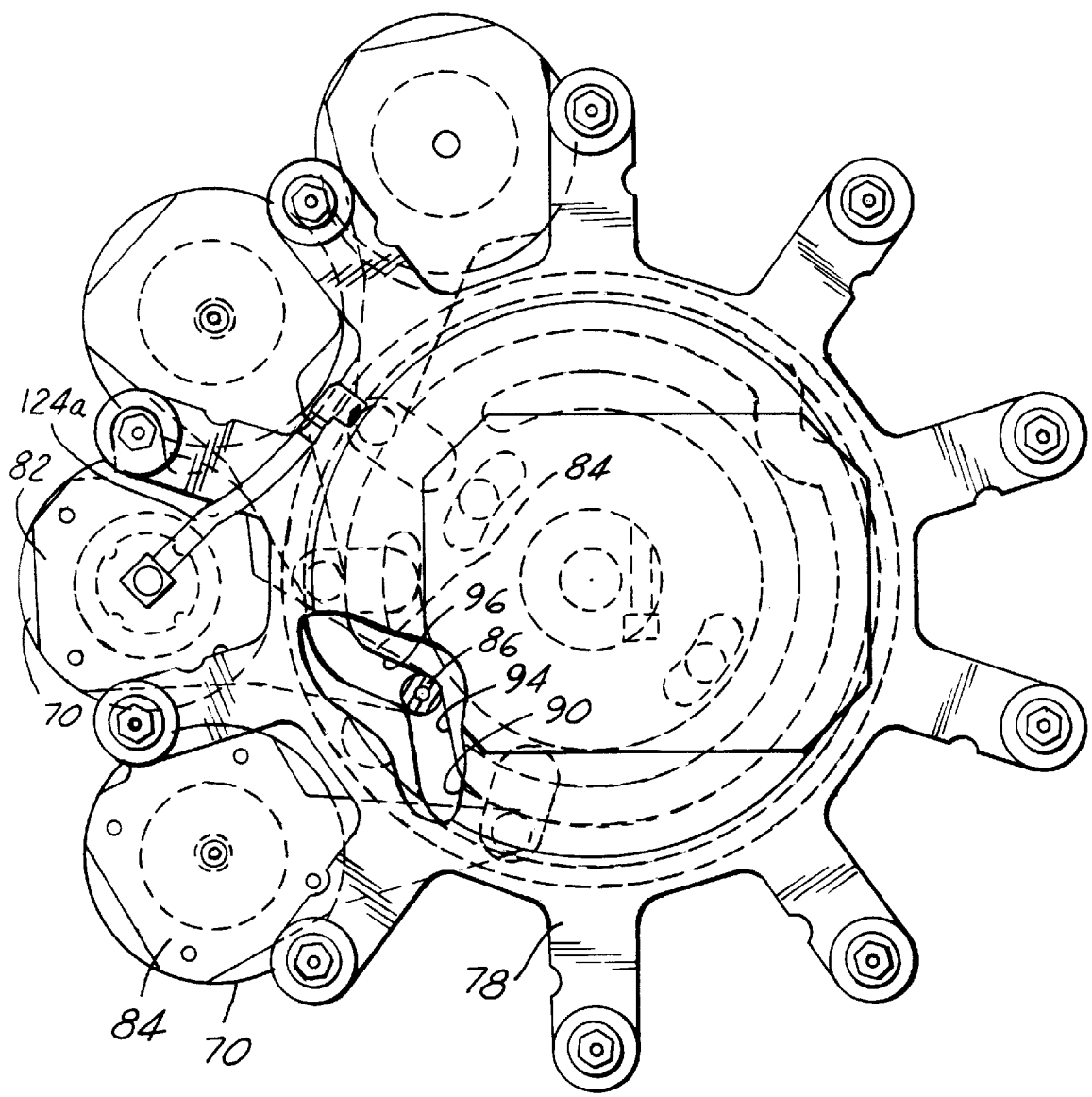
FIG. 7 is a part sectional plan view of a portion of the system shown in FIG. 2.

A modified form turret B is shown in FIG. 23 where a vacuum cup and crank assemblies 44a include crank arms 48a which have a cam follower 54a that follows a horizontal cam slot 58a and tip in a similar fashion as shown in FIG. 4.

Referring to FIG. 24, it can thus be seen that there has been provided a plastic closure with a label or disk embedded in the closure and a method and apparatus wherein the label or disk is delivered successively to the cavities of the compression molding machine.

I claim:

1. Apparatus for delivering labels from a source, in which labels are presented vertically downwardly in sequence, to a plurality of compression mold cavities moving in an arcuate path and into which the labels may be vertically dropped in sequence, said apparatus comprising:

a first turret rotatable about a vertical axis adjacent to said source, said first turret including a circumferential array of first crank arms each mounted on said first turret for pivoting about a horizontal axis, a vacuum cup carried by each said first crank arms, and means for selectively applying vacuum to each said vacuum cup in sequence, a second turret rotatable about a vertical axis adjacent to said mold cavity path, said second turret including a circumferential array of second crank arms each mounted on said second turret for pivoting about a vertical axis, a vacuum head carried by each said second crank arm, and means for selectively applying vacuum to each said vacuum head in turn, said first turret being disposed such that said vacuum cups pass in turn beneath said source and beneath said vacuum heads, and said second turret being disposed such that said vacuum heads pass in turn over said vacuum cups and over the compression mold cavities, first cam means surrounding said first turret and engaged with said first crank arms for pivoting said first crank arms to move said vacuum cups upwardly into engagement with said source and then downwardly to extract a label, and upwardly into engagement with a vacuum head and then downwardly to leave a label, and second cam means surrounding said second turret and engaged with said second crank arms for pivoting said second crank arms to orient said vacuum head to receive a label from an underlying vacuum cup, and to orient said vacuum head to deposit a label in an underlying compression mold cavity.

2. The apparatus set fort in claim 1 wherein said means for selectively applying vacuum to each said vacuum head comprises means for applying vacuum to each said vacuum head in turn as it is positioned overlying a vacuum cup to receive a label from the vacuum cup, and means for releasing vacuum at each said vacuum head in turn as it overlies a mold cavity to release the label to drop into the mold cavity.

3. The apparatus set forth in claim 2 wherein means for selectively applying vacuum to each said vacuum head comprises a stationing vacuum manifold disposed adjacent to said second turret and having stationary vacuum passages formed therein, and a distribution manifold carried by said second turret with vacuum passages coupled to each vacuum head and disposed for selective registry with said vacuum passages in said stationary manifold as said second turret rotates.

4. The apparatus set forth in claim 3 further comprising springs urging said stationary and distributor manifolds into rotary sliding engagement with each other.

5. The apparatus set forth in claim 3 wherein said stationary and distributor manifolds further comprises means for applying air under pressure to each said vacuum head in turn as the vacuum head overlies a mold cavity to assist release of a label into the mold cavity.

6. The apparatus set forth in claim 2 wherein said means for selectively applying vacuum to said vacuum cups comprises means for applying vacuum to each said vacuum cup in turn as it is positioned beneath the source, and means for releasing vacuum at each said vacuum cup in turn as it is positioned beneath a vacuum head on said second turret.

7. The apparatus set forth in claim 1 wherein said first and second crank arms each include rollers engaged with said first and second cam means respectively.

8. The apparatus set forth in claim 1 wherein said source comprises a third turret having a plurality of label magazines carried thereon.

9. A method of delivering labels from a source, in which the labels are presented vertically downwardly in sequence, to a plurality of compression mold cavities moving in an arcuate path and into which the labels may be vertically dropped in sequence, said method comprising the steps of:

(a) mounting a plurality of vacuum cups in a circumferential array on a first turret, (b) mounting a plurality of vacuum heads in a circumferential array on a second turret, (c) rotating said first turret about a vertical axis such that the vacuum cups pass in sequence beneath said source and beneath said vacuum heads, (d) rotating said second turret about a vertical axis such that said vacuum heads pass in sequence over said vacuum cups and over said mold cavities, (e) as each vacuum cup in turn passes beneath said source, moving the vacuum cup upwardly against a label at said source, applying vacuum to the cup, and moving the cup downwardly from the source such that a label is retained by the vacuum to the cup, (f) as each vacuum cup in turn passes beneath a vacuum head, moving the vacuum cup upwardly against the vacuum head, applying vacuum to the vacuum head, releasing vacuum at the vacuum cup, and moving the vacuum cup downwardly from the vacuum head so that the label carried by the vacuum cup is transferred to the vacuum head, and (g) as each vacuum head in turn passes over a mold cavity, releasing vacuum at the vacuum head to release the label carried thereby to drop into the underlying mold cavity.

10. The method set forth in claim 9 wherein said steps (f) and (g) include the step of maintaining constant orientation of each vacuum head in turn during transfer of a label from an underlying vacuum cup and transfer of the label to an underlying mold cavity.

11. The method set forth in claim 9 wherein said step (g) includes the step of applying air under pressure to each said vacuum head in turn following release of vacuum to assist separation of the label from the vacuum head.

* * * * *